Patented July 15, 1947

2,423,971

UNITED STATES PATENT OFFICE 2,423,971

VITREOUS GLAZES AND ENAMELS

Lewis D. Gittings, Anniston, Ala., assignor to Monsanto Chemical Company, St. Louis, Mo., a corporation of Delaware No Drawing. Application April 8, 1944,
Serial No. 530,185

4 Claims. (Cl. 106—49)

This invention relates to a method and compound for producing white opaque and opalescent glazes and enamels.

An object of the invention is to provide a novel vitreous composition of matter including aluminum metaphosphate as an opacifier which may be used as a ceramic glaze to prevent ceramic articles from absorbing liquids or gases, to give said articles a more pleasing appearance and to serve as a foundation for various types of decoration.

Another object of the invention is to provide a white opaque enamel containing aluminum metaphosphate as an opacifier which may be applied to pottery, ceramics generally and metal ware such as sheet iron or steel.

A further object of the invention is to provide an opacifier for ceramic glazes, enamels and other vitreous compositions which may be used to completely or partially replace tin oxide and the other common opacifiers now employed in the ceramic, enamel and glass industry.

A still further object of the invention is to provide a novel opacifying material which is economical and has none of the objectionable features of the opacifiers formerly employed or of those now on the market.

Another object is to provide as a novel opacifier aluminum metaphosphate.

An additional object is to provide ceramic articles coated with a vitreous glaze containing aluminum metaphosphate in sufficient quantities to impart opacity thereto.

Another object is to provide enameled metal ware in which the enamel contains aluminum metaphosphate as an opacifying material.

Other objects of the invention will be apparent to those skilled in the art as the description of the invention proceeds.

In the past antimony oxides, fluorides, arsenic oxide, titanium oxide, zirconium oxide and tin oxide have been employed with varying degrees of success in the production of opaque glasses, glazes and enamels.

Antimony oxides, for example, are quite useful as opacifying agents in glazes maturing below 1200° C., but cannot be used satisfactorily above this temperature. These compounds also cannot be used for certain purposes, particularly in the field of enameled kitchenware as food acids etch the enameled surface and dissolve out appreciable quantities of antimony compounds which are toxic.

Fluorides, particularly zirconium fluorides, have been partially successful as opacifiers for soft glazes, enamels and glass, but like antimony oxides they are not suitable for making opaque glazes which mature at a temperature above 1200° C. The conditions which seem to be unfavorable to use of fluorides (particularly fluorspar) in opaque glazes are: the prolonged exposure to high temperature generally necessary in glaze kilns; the slow cooling necessary for glazed wares; the chemical reactions with the body and possibly the physical distribution of the glaze as a thin layer. It is also known that fluorspar in some vitreous bodies has given trouble by blistering when at a temperature of cones 10 and 11.

Arsenic oxide and arsenious acid have been used as opacifiers in opaque glazes and enamels, but neither one of these substances gives such satisfactory results as tin oxide and they are barred from culinary ware in view of their toxicity.

Zirconia and titania when freed from iron and otherwise purified are satisfactory and valuable opacifying agents, but hitherto they have not been obtained economically in a purified state. However, they are not as effective as tin oxide because they possess a lower covering power.

Tin oxide has been successfully used for many years as an opacifier for glazes, enamels and glass. However, this compound has the objectionable feature of requiring a high degree of purity as the presence of extremely small percentages of some of the other oxides will stain the product usually by producing spots or discolored patches. This objectionable feature together with the fact that tin oxide is no longer available in the desired amounts has led to numerous attempts to replace it by the above compounds and many other compounds including zircon, boron compounds and bone ash. The efforts in this direction, however, have met with only a limited amount of success so that tin oxide still remains the chief opacifying material for glass, glazes, enamels and other vitreous compositions.

Now I have discovered that aluminum metaphosphate is an excellent substitute for tin oxide and the other opacifiers now on the market. It appears to compare quite favorably with tin oxide in covering power and opacifying effect and it is readily available in the desired quantities. It may be used in glazes, enamels and other vitreous compositions maturing above or below 1200° C. It is, however, particularly suitable for use in compositions of this type maturing above 1200° C. and it apparently has none of the objectionable qualities which are characteristic of the opacifiers referred to above.

The invention is illustrated but not limited by the following examples:

EXAMPLE I

*Composition of a white opaque glaze*

| | Parts by weight |
|---|---|
| White lead | 103 |
| Whiting | 25 |
| Feldspar | 111 |
| Zinc oxide | 12 |
| Kaolin | 13 |
| Flint | 27 |
| Aluminum metaphosphate | 45 |

*Composition expressed according to the Seger formula*

$$\left.\begin{array}{l} 0.40 \text{ mole of PbO} \\ 0.25 \text{ mole of CaO} \\ 0.20 \text{ mole of K}_2\text{O} \\ 0.15 \text{ mole of ZnO} \end{array}\right\} 0.33 \text{ mole of Al}_2\text{O}_3 \left\{\begin{array}{l} 1.75 \text{ moles of SiO}_2 \\ 0.25 \text{ mole of P}_2\text{O}_5 \end{array}\right.$$

*Glaze expressed on an oxide basis*

| | Per cent |
|---|---|
| PbO | 28.80 |
| CaO | 4.52 |
| K₂O | 6.08 |
| ZnO | 3.94 |
| Al₂O₃ | 10.85 |
| SiO₂ | 33.90 |
| P₂O₅ | 11.91 |
| | 100.0 |

EXAMPLE II

*Composition of a white opaque glaze*

| | Parts by weight |
|---|---|
| White lead | 103.00 |
| Whiting | 25.00 |
| Feldspar | 111.00 |
| Zinc oxide | 12.00 |
| Kaolin | 13.00 |
| Flint | 27.00 |
| Aluminum metaphosphate | 53.50 |

*Composition expressed according to the Seger formula*

$$\left.\begin{array}{l} 0.40 \text{ mole of PbO} \\ 0.25 \text{ mole of CaO} \\ 0.20 \text{ mole of K}_2\text{O} \\ 0.15 \text{ mole of ZnO} \end{array}\right\} 0.35 \text{ mole of Al}_2\text{O}_3 \left\{\begin{array}{l} 1.75 \text{ moles of SiO}_2 \\ 0.30 \text{ mole of P}_2\text{O}_5 \end{array}\right.$$

*Glaze expressed on an oxide basis*

| | Per cent |
|---|---|
| PbO | 28.10 |
| CaO | 4.41 |
| K₂O | 5.93 |
| ZnO | 3.84 |
| Al₂O₃ | 11.23 |
| SiO₂ | 33.08 |
| P₂O₅ | 13.41 |
| | 100.00 |

EXAMPLE III

*Composition of a white opaque glaze*

| | Parts by weight |
|---|---|
| White lead | 103.00 |
| Whiting | 25.00 |
| Feldspar | 111.00 |
| Zinc oxide | 12.00 |
| Kaolin | 13.00 |
| Flint | 27.00 |
| Al(PO₃)₃ | 62.00 |

*Composition expressed according to the Seger formula*

$$\left.\begin{array}{l} 0.40 \text{ mole of PbO} \\ 0.25 \text{ mole of CaO} \\ 0.20 \text{ mole of K}_2\text{O} \\ 0.15 \text{ mole of ZnO} \end{array}\right\} 0.37 \text{ mole of Al}_2\text{O}_3 \left\{\begin{array}{l} 1.75 \text{ moles of SiO}_2 \\ 0.35 \text{ mole of P}_2\text{O}_5 \end{array}\right.$$

*Glaze expressed on an oxide basis*

| | Per cent |
|---|---|
| PbO | 27.31 |
| CaO | 4.29 |
| K₂O | 5.76 |
| ZnO | 3.73 |
| Al₂O₃ | 11.54 |
| SiO₂ | 32.15 |
| P₂O₅ | 15.21 |
| | 99.99 |

EXAMPLE IV

*Composition of a white opaque glaze*

| | Parts by weight |
|---|---|
| White lead | 103 |
| Whiting | 25 |
| Feldspar | 111 |
| Zinc oxide | 12 |
| Kaolin | 13 |
| Flint | 27 |
| Aluminum metaphosphate | 78.75 |

*Composition expressed according to the Seger formula*

$$\left.\begin{array}{l} 0.40 \text{ mole of PbO} \\ 0.20 \text{ mole of K}_2\text{O} \\ 0.25 \text{ mole of CaO} \\ 0.15 \text{ mole of ZnO} \end{array}\right\} 0.40 \text{ mole of Al}_2\text{O}_3 \left\{\begin{array}{l} 1.75 \text{ moles of SiO}_2 \\ 0.45 \text{ mole of P}_2\text{O}_5 \end{array}\right.$$

*Glaze expressed on an oxide basis*

| | Per cent |
|---|---|
| PbO | 25.94 |
| CaO | 4.08 |
| K₂O | 5.47 |
| ZnO | 3.54 |
| Al₂O₃ | 11.85 |
| SiO₂ | 30.54 |
| P₂O₅ | 18.57 |
| | 99.99 |

The materials given in each of the above examples were weighed out in grams, introduced into a porcelain mill with about a half-pint of water and ground for about 45 minutes. The ground mixture, thus diluted, was strained through a lawn of 120 mesh and laid aside to settle. The clear water was then poured off and the raw glaze was ready for use.

The glaze was applied to ceramic tile by dipping and the product thus coated was fired in a muffle furnace at a temperature above 1200° C. In every case a firmly bonded glossy white opaque glaze was formed on the surface of the tile.

The raw glaze prepared in the manner described and from the ingredients given in Examples I, II, III and IV are suitable for use in glazing ceramic articles generally, stoneware, sanitary ware and other types of earthenware.

EXAMPLE V

*Composition of a white opaque enamel*

|  | Parts by weight |
|---|---|
| Potash feldspar | 195.0 |
| Sodium carbonate | 27.5 |
| Sodium nitrate | 17.5 |
| Borax | 125.0 |
| Barium carbonate | 35.0 |
| Zinc oxide | 42.5 |
| Red lead | 42.5 |
| Calcium carbonate | 15.0 |
| Fluorspar | 36.5 |
| Aluminum metaphosphate | 45.0 |

This mixture when melted, quenched, dried, milled, applied to sheet iron and fired at a temperature of about 726° C. gave an enamel of good opacity, color and lustre.

The above enameling composition may be applied directly to cast iron, copper, steel and the like to form sanitary articles, wash stands, sinks, bath tubs, etc. In some instances, however, it is desirable in the interest of obtaining a more permanent bond to the base metal to apply the enamel over a suitable ground coating.

The aluminum metaphosphate may be employed in amounts varying from about 8% to about 25% by weight of the raw glaze, enamel or vitreous composition, but it is within the scope of my invention to use larger or smaller amounts of opacifier, the amount employed being dependent upon the degree of opalescence or opacity desired and the type and composition of the glaze, enamel or vitreous composition. If desired, the aluminum metaphosphate may be partially substituted by other well known opacifiers.

The aluminum metaphosphate opacifier may be added to the raw glaze or enamel, to the raw frit before smelting, to the smelted frit, to the mill batch or to two or more of these stages in the manner well known to the ceramic engineer.

While the foregoing description has been limited to glazes and enamels which contain a lead compound or feldspar as the principal flux, it should be clearly understood that my invention is not restricted thereto but is applicable also to other types of glazes, enamels and vitreous compositions.

The invention, therefore, is not limited to the specific examples but may be otherwise embodied or practiced within the scope of the following claims.

I claim:

1. A white opaque glaze having the following Seger formula:

$$\left.\begin{array}{l}0.40 \text{ mole of PbO}\\0.25 \text{ mole of CaO}\\0.20 \text{ mole of K}_2\text{O}\\0.15 \text{ mole of ZnO}\end{array}\right\}0.33 \text{ mole of Al}_2\text{O}_3\left\{\begin{array}{l}1.75 \text{ moles of SiO}_2\\0.25 \text{ mole of P}_2\text{O}_5\end{array}\right.$$

2. A white opaque glaze having the following Seger formula:

$$\left.\begin{array}{l}0.40 \text{ mole of PbO}\\0.25 \text{ mole of CaO}\\0.20 \text{ mole of K}_2\text{O}\\0.15 \text{ mole of ZnO}\end{array}\right\}0.37 \text{ mole of Al}_2\text{O}_3\left\{\begin{array}{l}1.75 \text{ moles of SiO}_2\\0.35 \text{ mole of P}_2\text{O}_5\end{array}\right.$$

3. A white opaque glaze having the following Seger formula:

$$\left.\begin{array}{l}0.40 \text{ mole of PbO}\\0.20 \text{ mole of K}_2\text{O}\\0.25 \text{ mole of CaO}\\0.15 \text{ mole of ZnO}\end{array}\right\}0.40 \text{ mole of Al}_2\text{O}_3\left\{\begin{array}{l}1.75 \text{ moles of SiO}_2\\0.45 \text{ mole of P}_2\text{O}_5\end{array}\right.$$

4. A white opaque glaze having a composition within the range expressed by the following Seger formula:

$$\left.\begin{array}{l}0.40 \text{ mole of PbO}\\0.25 \text{ mole of CaO}\\0.20 \text{ mole of K}_2\text{O}\\0.15 \text{ mole of ZnO}\end{array}\right\}0.33\text{--}0.40 \text{ mole of Al}_2\text{O}_3\left\{\begin{array}{l}1.75 \text{ moles of SiO}_2\\0.25\text{--}0.45 \text{ mole of P}_2\text{O}_5\end{array}\right.$$

LEWIS D. GITTINGS.

REFERENCES CITED

The following references are of record in the file of this patent:

UNITED STATES PATENTS

| Number | Name | Date |
|---|---|---|
| 1,303,268 | Drakenfeld | May 13, 1919 |
| 2,252,588 | Whitesell | Aug. 12, 1941 |
| 2,339,260 | Frast et al. | Jan. 18, 1944 |
| 1,287,005 | Handy | Dec. 10, 1918 |

FOREIGN PATENTS

| Number | Country | Date |
|---|---|---|
| 3,988 | Sweden | 1892 |